> # (12) United States Patent
> ## Liu et al.
>
> (10) Patent No.: US 9,608,467 B2
> (45) Date of Patent: Mar. 28, 2017

(54) SYSTEM AND METHOD FOR CHARGING A CAPACITOR USED TO POWER MEASUREMENT-WHILE-DRILLING EQUIPMENT

(71) Applicant: EVOLUTION ENGINEERING INC., Calgary (CA)

(72) Inventors: Jili Liu, Calgary (CA); Xia Pan, Calgary (CA)

(73) Assignee: EVOLUTION ENGINEERING INC. (CA)

( * ) Notice: Subject to any disclaimer, the term of this patent is extended or adjusted under 35 U.S.C. 154(b) by 0 days.

(21) Appl. No.: 14/771,729

(22) PCT Filed: Mar. 7, 2014

(86) PCT No.: PCT/CA2014/050197
§ 371 (c)(1),
(2) Date: Aug. 31, 2015

(87) PCT Pub. No.: WO2014/134739
PCT Pub. Date: Sep. 12, 2014

(65) Prior Publication Data
US 2016/0064966 A1    Mar. 3, 2016

Related U.S. Application Data

(60) Provisional application No. 61/774,068, filed on Mar. 7, 2013.

(51) Int. Cl.
*H02J 7/00*     (2006.01)
*E21B 41/00*    (2006.01)
*H02J 7/34*     (2006.01)

(52) U.S. Cl.
CPC .......... *H02J 7/008* (2013.01); *E21B 41/0085* (2013.01); *H02J 7/0068* (2013.01); *H02J 7/345* (2013.01)

(58) Field of Classification Search
CPC ....................................................... H02J 7/008
(Continued)

(56) References Cited

U.S. PATENT DOCUMENTS 6,031,359 A * 2/2000 Michelsen ............ H02J 7/0077
                                                       320/141
6,075,331 A    6/2000 Ando et al.
(Continued)

FOREIGN PATENT DOCUMENTS

JP    2006246675 A    9/2006
JP    2010246198 A    10/2010
(Continued)

OTHER PUBLICATIONS

International Search Report for PCT/CA2014/050197, mailed on Jun. 9, 2014.
(Continued)

*Primary Examiner* — Samuel Berhanu
*Assistant Examiner* — Tessema Kebede
(74) *Attorney, Agent, or Firm* — George C. Rondeau, Jr.; Davis Wright Tremaine LLP

(57) ABSTRACT

A system for charging a capacitor used to power measurement-while-drilling equipment includes a power bus, which is electrically connected to the capacitor; a first pair of battery terminals; switching circuitry for electrically connecting the power bus to and disconnecting the power bus from the first pair of battery terminals; and a controller, for controlling the switching circuitry, which is configured to charge the capacitor by applying a first pulse width modulated control signal to control the switching circuitry. The first pulse width modulated control signal has a duty cycle selected such that the voltage of the first battery remains above a first minimum operating voltage while the capacitor is being charged.

41 Claims, 10 Drawing Sheets

(58) Field of Classification Search
USPC .......................................................... 320/166
See application file for complete search history.

(56) References Cited

U.S. PATENT DOCUMENTS

| | | | | |
|---|---|---|---|---|
| 7,619,394 | B2* | 11/2009 | Pai | H05B 41/32 320/134 |
| 7,786,620 | B2* | 8/2010 | Vuk | H01M 10/4264 307/66 |
| 8,264,208 | B2* | 9/2012 | Wardensky | H01G 11/14 320/166 |
| 2003/0048697 | A1 | 3/2003 | Hirsch et al. | |
| 2007/0194751 | A1* | 8/2007 | Odaohhara | H02J 7/0031 320/112 |
| 2008/0007222 | A1* | 1/2008 | Nance | G01R 31/3693 320/128 |
| 2010/0079109 | A1* | 4/2010 | Eilertsen | H02J 7/345 320/127 |
| 2013/0038289 | A1* | 2/2013 | Tse | H02M 3/158 320/118 |

FOREIGN PATENT DOCUMENTS

| | | | |
|---|---|---|---|
| WO | 2006060708 | A1 | 6/2006 |
| WO | 2012162500 | A2 | 11/2012 |

OTHER PUBLICATIONS

Office Action from the Canadian Patent Office issued in corresponding Application No. CA 2,903,085, mailed Jan. 21, 2016.

\* cited by examiner

SYSTEM AND METHOD FOR CHARGING A CAPACITOR USED TO POWER MEASUREMENT-WHILE-DRILLING EQUIPMENT

TECHNICAL FIELD

The present disclosure is directed at systems, methods, and techniques for charging a capacitor used to power measurement-while-drilling equipment.

BACKGROUND

The recovery of hydrocarbons from subterranean zones relies on the process of drilling wellbores. The process includes using drilling equipment situated at surface and a drill string extending from equipment on the surface to a subterranean zone of interest such as a formation. The drill string can extend thousands of meters below the surface. The downhole terminal end of the drill string includes a drill bit for drilling the wellbore. Drilling wellbores also typically involves using some sort of drilling fluid system to pump a drilling fluid ("mud") through the inside of the drill string, which cools and lubricates the drill bit and then exits out of the drill bit and carries rock cuttings back to the surface. The mud also helps control bottom hole pressure and prevents hydrocarbon influx from the formation into the wellbore and potential blow out at the surface.

Directional drilling is the process of steering a well from vertical to intersect a target endpoint or to follow a prescribed path. At the downhole terminal end of the drill string is a bottom-hole-assembly ("BHA") that includes 1) the drill bit; 2) a steerable downhole mud motor; 3) sensors including survey equipment (e.g. one or both of logging-while-drilling ("LWD") and measurement-while-drilling ("MWD") tools (both "LWD" and "MWD" are hereinafter collectively referred to as "MWD" for simplicity)) to evaluate downhole conditions as drilling progresses; 4) telemetry equipment to transmit data to surface; and 5) other control equipment such as stabilizers or heavy weight drill collars. The BHA is conveyed into the wellbore by a string of metallic tubulars known as drill pipe. The MWD equipment is used to provide in a near real-time mode downhole sensor and status information to the surface while drilling. This information is used by the rig operator to make decisions about controlling and steering the drill string to optimize the drilling speed and trajectory based on numerous factors, including lease boundaries, existing wells, formation properties, hydrocarbon size and location, etc. This can include making intentional deviations from the planned wellbore path as necessary based on the information gathered from the downhole sensors during the drilling process. The ability to obtain real-time data allows for a relatively more economical and more efficient drilling operation.

MWD is performed using MWD tools, each of which contains a sensor package to survey the wellbore and to send data back to the surface by various telemetry methods. Such telemetry methods include, but are not limited to telemetry via a hardwired drill pipe, acoustic telemetry, telemetry via a fiber optic cable, mud pulse ("MP") telemetry and electromagnetic ("EM") telemetry.

MP telemetry involves using a fluid pressure pulse generator to create pressure waves in the circulating mud in the drill string. Mud is circulated between the surface and downhole using positive displacement pumps. The resulting flow rate of mud is typically constant. The pulse generator creates pressure pulses by changing one or both of the flow area and path of the mud as it passes through the MWD tool in a timed, coded sequence, thereby creating pressure differentials in the drilling fluid. The pressure differentials or pulses may either be negative pulse or positive pulses in nature. Valves that use a controlled restriction within the circulating mud stream create a positive pressure pulse. Some valves are hydraulically powered to reduce the required actuation power typically by using a main valve controlled by a pilot valve. The pilot valve closes a flow restriction, which actuates the main valve and creates a change in pressure.

The pressure pulses generated by the pulse generator are used to transmit information acquired by the downhole sensors. Signals from the sensors are received and processed in a data encoder in the BHA where the data is digitally encoded. A controller then actuates the pulse generator to generate the mud pulses, which are modulated to represent the data. For example, the directional or inclination data is conveyed or modulated using the physical mud pulse by generating the mud pulse at a particular amplitude and frequency. Typically a high-frequency sinusoid waveform is used as a carrier signal, but a square wave pulse train may also be used.

A typical arrangement for EM telemetry uses parts of the drill string as an antenna. The drill string is divided into two conductive sections by including an electrically insulating joint or connector (a "gap sub") in the drill string. The gap sub is typically placed within the BHA such that metallic drill pipe in the drill string above the gap sub serves as one antenna element and metallic sections below the gap sub serve as another antenna element. EM telemetry signals can then be transmitted by applying electrical signals across the two antenna elements. The signals typically include very low frequency AC signals applied in a manner that codes information for transmission to the surface. The electromagnetic signals may be detected at the surface, for example by measuring electrical potential differences between the drill string and one or more grounding rods spaced from the drill string.

Both EM and MP telemetry systems use a downhole source of power. One common power source is downhole batteries.

MWD systems contain power systems that are generally of two types. The first type uses a turbine or other generator to produce power downhole, and the second type uses specialized batteries developed for downhole applications. Turbines are powered via circulation of drilling fluid, whereas batteries operate independently of drilling fluid flow. In some cases, both types of power systems are used to help ensure adequate power is delivered to service all downhole load requirements. The batteries are typically lithium-thionyl chloride batteries, which provide high energy density and can withstand temperatures of up to approximately 180 -200° C. Many downhole batteries are rated to be able to store approximately 26-28 A·h@3.6 V per cell. The load is generally determined by electrical components within the BHA, drill collar geometry, gap sub or mud pulser specifications, and the properties of the surrounding formation. As an example, the current drawdown on the gap sub will vary depending on signal attenuation to the surface; or in a mud pulser, the current drawdown will vary with the torque required to actuate the valve that generates mud pulses. An example of a typical industry battery is Exium™ Technologies Inc. MWD 3.6 DD size Li—$SOCl_2$.

Notwithstanding these existing battery management systems, there exists a continued need for methods, systems, and techniques to manage batteries used in downhole MWD applications.

SUMMARY

According to a first aspect, there is provided a system for charging a capacitor used to power measurement-while-drilling equipment, which comprises a power bus, wherein the capacitor is electrically connected to the power bus; a first pair of battery terminals for connecting to a first battery; switching circuitry operable to electrically connect the power bus to and to disconnect the power bus from the first pair of battery terminals; and a controller, operable to control the switching circuitry, and configured to charge the capacitor by applying a first pulse width modulated control signal to control the switching circuitry, wherein the first pulse width modulated control signal has a duty cycle selected such that the voltage of the first battery remains above a first minimum operating voltage while the capacitor is being charged.

The minimum operating voltage may be a reset voltage, and the controller may be further configured to reset the system if the voltage of the first battery drops below the reset voltage. The controller may be further configured to disconnect the first pair of battery terminals from the power bus when the voltage of the first battery drops below a voltage floor, and the voltage floor is above the reset voltage. The voltage floor may be approximately 50% of the maximum voltage of the battery.

The first pulse width modulated control signal may be configured to cause the first battery to be connected to the power bus for approximately 1.5 ms and disconnected from the power bus for approximately 2 ms for each charging cycle.

The controller may be configured to charge the capacitor for a charging period. The controller may be further configured to electrically connect the first pair of battery terminals to the capacitor following the charging period and to subsequently indefinitely keep the first pair of battery terminals and the capacitor electrically connected.

The system may further comprise a first voltmeter, communicative with the controller, and electrically connected in parallel to the first pair of battery terminals such that the voltage of the first battery can be determined.

The system may further comprise a first ammeter electrically connected in series to the first pair of battery terminals such that current flowing out of the first battery can be determined.

The system may further comprise a second pair of battery terminals for connecting to a second battery and which are electrically connected in parallel to the first pair of battery terminals. Switching circuitry is operable to electrically connect the power bus to and to disconnect the power bus from the second pair of battery terminals independently from the first pair of battery terminals. The controller is further configured to apply a second pulse width modulated control signal to the switching circuitry such that the system alternates between only charging the capacitor using the first battery, by electrically connecting the first pair of battery terminals to the power bus, and electrically disconnecting the second pair of battery terminals from the power bus. The controller is further configured to only charge the capacitor using the second battery by electrically connecting the second pair of battery terminals to the power bus and electrically disconnecting the first pair of battery terminals from the power bus, wherein the second pulse width modulated control signal has a duty cycle selected such that the voltage of the second battery remains above a second minimum operating voltage while the capacitor is being charged.

The first and second minimum operating voltages may be identical. The minimum operating voltages may be a reset voltage, and the controller may be further configured to reset the system if the voltage of the first or second batteries drops below the reset voltage.

The controller may be further configured to disconnect the first pair of battery terminals from the power bus when the voltage of the first battery drops below a first voltage floor and to disconnect the second pair of battery terminals from the power bus when the voltage of the second battery drops below a second voltage floor, wherein the voltage floors may be above the reset voltage.

The first and second voltage floors may be identical. The voltage floors may be approximately 50% of the maximum voltage of the first battery.

The pulse width modulated control signals may be configured to cause the capacitor to always be charged by at least one of the batteries if the capacitor voltage drops below the battery voltage. The pulse width modulated control signals may be further configured to cause each of the batteries to be connected to the power bus for approximately 1.5 ms for each charging cycle.

The controller may be configured to charge the capacitor for a charging period. The controller may be further configured to electrically connect at least one of the pairs of battery terminals to the capacitor following the charging period and to subsequently indefinitely keep the at least one of the pairs of battery terminals and the capacitor electrically connected.

The system may further comprise first and second voltmeters which are communicative with the controller, and which are electrically connected in parallel to the first and second pairs of battery terminals, respectively, such that the voltages of the first and second batteries can be determined.

The system may further comprise first and second ammeters which are electrically connected in series to the first and second pairs of battery terminals, respectively, such that current flowing out of the first and second batteries can be determined.

According to another aspect, there is provided a method for charging a capacitor used to power measurement-while-drilling equipment. The method comprises applying a first pulse width modulated control signal to intermittently electrically connect the capacitor to and disconnect the capacitor from a first battery, wherein the first pulse width modulated control signal has a duty cycle selected such that the voltage of the first battery remains above a first minimum operating voltage while the capacitor is being charged. The minimum operating voltage may be a reset voltage, and the method may further comprise monitoring the voltage of the first battery; and resetting circuitry used to charge the capacitor if the voltage of the first battery drops below the reset voltage.

The method may further comprise disconnecting the first pair of battery terminals from the capacitor when the voltage of the first battery drops below a voltage floor, wherein the voltage floor is above the reset voltage. The voltage floor may be approximately 50% of the maximum voltage of the first battery.

The first pulse width modulated control signal may be configured to cause the first battery to be connected to the power bus for approximately 1.5 ms and disconnected from the power bus for approximately 2 ms for each charging cycle.

The first battery may charge the capacitor for a charging period. The method may further comprise, following the charging period, electrically connecting the first pair of battery terminals to the capacitor and subsequently indefinitely keeping the first pair of battery terminals and the capacitor electrically connected.

The method may further comprise applying a second pulse width modulated control signal to intermittently electrically connect the capacitor to and disconnect the capacitor from a second battery. The pulse width modulated control signals are configured to alternate between only charging the capacitor using the first battery by electrically connecting the first pair of battery terminals to the power bus and electrically disconnecting the second pair of battery terminals from the power bus; and only charging the capacitor using the second battery by electrically connecting the second pair of battery terminals to the power bus and electrically disconnecting the first pair of battery terminals from the power bus. The second pulse width modulated control signal has a duty cycle selected such that the voltage of the second battery remains above a second minimum operating voltage while the capacitor is being charged.

The first and second minimum operating voltages may be identical. The minimum operating voltages may be a reset voltage and the method may further comprise monitoring the voltages of the first and second batteries; and resetting circuitry used to charge the capacitor if the voltage of the first battery drops below the reset voltage.

The method may further comprise disconnect the first pair of battery terminals from the power bus when the voltage of the first battery drops below a first voltage floor and disconnecting the second pair of battery terminals from the power bus when the voltage of the second battery drops below a second voltage floor, wherein the voltage floors are above the reset voltage. The first and second voltage floors may be identical. The voltages of the first and second batteries may be identical and the voltage floors are approximately 50% of the maximum voltage of the battery.

The pulse width modulated control signals may be configured to cause the capacitor to always be charged by at least one of the batteries. The pulse width modulated control signals may be further configured to cause each of the batteries to be connected to the power bus for approximately 1.5 ms for each charging cycle.

The capacitor may be charged for a charging period. The method may further comprise electrically connecting at least one of the pairs of battery terminals to the capacitor following the charging period and subsequently indefinitely keeping the at least one of the pairs of battery terminals and the capacitor electrically connected.

According to another aspect, there is provided a non-transitory computer readable medium having encoded thereon statements and instructions configured to cause a controller to perform any of the foregoing methods.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more exemplary embodiments.

DETAILED DESCRIPTION

Directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment.

Figure 1:
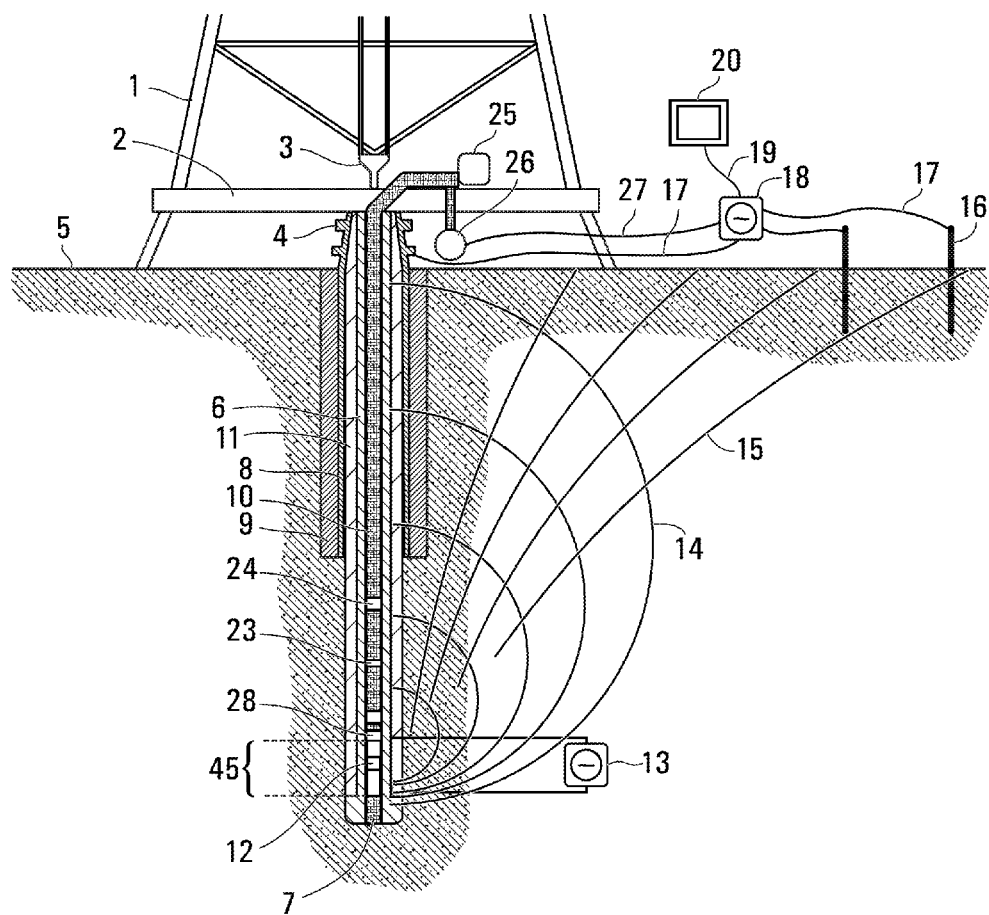
FIG. 1 shows a telemetry system that is capable of both electromagnetic and mud pulse telemetry, according to one embodiment.

Referring to FIG. 1, there is shown a schematic representation of a combined EM and MP telemetry system in which various embodiments of a system for charging a capacitor can be employed. It is to be noted that while FIG. 1 depicts a combined EM and MP telemetry systems, embodiments of the capacitor charging system can also be used in EM-only and MP-only telemetry systems (not shown). Downhole drilling equipment including a derrick 1 with a rig floor 2 and draw works 3 facilitate rotation of drill pipe 6 into the ground 5. The drill pipe 6 is enclosed in casing 8 which is fixed in position by casing cement 9. Bore drilling fluid 10 is pumped down the drill pipe 6 and through an electrically isolating gap sub assembly 12 by a mud pump 25 to a drill bit 7. Annular drilling fluid 11 is then pumped back to the surface and passes through a blowout preventer ("BOP") 4 positioned above the ground surface. The gap sub assembly 12 is electrically isolated (nonconductive) at its center joint effectively creating an electrically insulating break, known as a gap between the top and bottom parts of the gap sub assembly 12. The gap sub assembly 12 may form part of the BHA and be positioned at the top part of the BHA, with the rest of the BHA below the gap sub assembly 12 and the drill pipe 6 above the gap sub assembly 12 each forming an antennae for a dipole antennae.

The combined EM and MP telemetry system comprises a downhole MWD telemetry tool 45 and surface receiving and processing equipment. The telemetry tool 45 comprises an EM telemetry unit having an EM signal generator 13 which generates an alternating electrical current 14 that is driven across the gap sub assembly 12 to generate carrier waves or pulses which carry encoded telemetry data ("EM telemetry transmission"). The low frequency AC voltage and magnetic reception is controlled in a timed/coded sequence by the telemetry tool 45 to energize the earth and create an electrical field 15, which propagates to the surface and is detectable by the surface receiving and processing equipment 18 of the MWD telemetry system. The telemetry tool 45 also includes a MP telemetry unit having a fluid pressure pulse generator 28 for generating pressure pulses in the drilling fluid 10 which carry encoded telemetry data ("MP telemetry transmission"). The fluid pressure pulse generator 28 can be actuated by an MP transmitter 30 (shown in FIG. 2), comprising a motor (not shown), between an open configuration in which no pressure pulse is generated, a reduced flow configuration in which a full positive pressure pulse is generated (represented schematically as full pressure pulse 24), and an intermediate flow configuration in which an intermediate positive pressure pulse (represented schematically as intermediate pressure pulse 23) is generated.

At surface, the surface receiving and processing equipment includes a receiver box 18, computer 20 and other equipment to detect and process both EM and MP telemetry transmissions. To detect EM telemetry transmissions, communication cables 17 transmit the measurable voltage differential from the top of the drill string and various surface grounding rods 16 located about the drill site to EM signal processing equipment, which receives and processes the EM telemetry transmission. The grounding rods 16 are generally randomly located on site with some attention to site operations and safety. The EM telemetry signals are received by the receiver box 18 and then transmitted to the computer 20 for decoding and display, thereby providing EM measurement-while-drilling information to the rig operator. To detect MP telemetry transmissions, a pressure transducer 26 that is fluidly coupled with the mud pump 25 senses the pressure pulses 23,24 and transmits an electrical signal, via a pressure transducer communication cable 27, to MP signal processing equipment for processing. The MP telemetry transmission is decoded and decoded data is sent to the computer display 20 via the communication cable 19, thereby providing MP measurement-while-drilling information to the rig operator.

Figure 2:
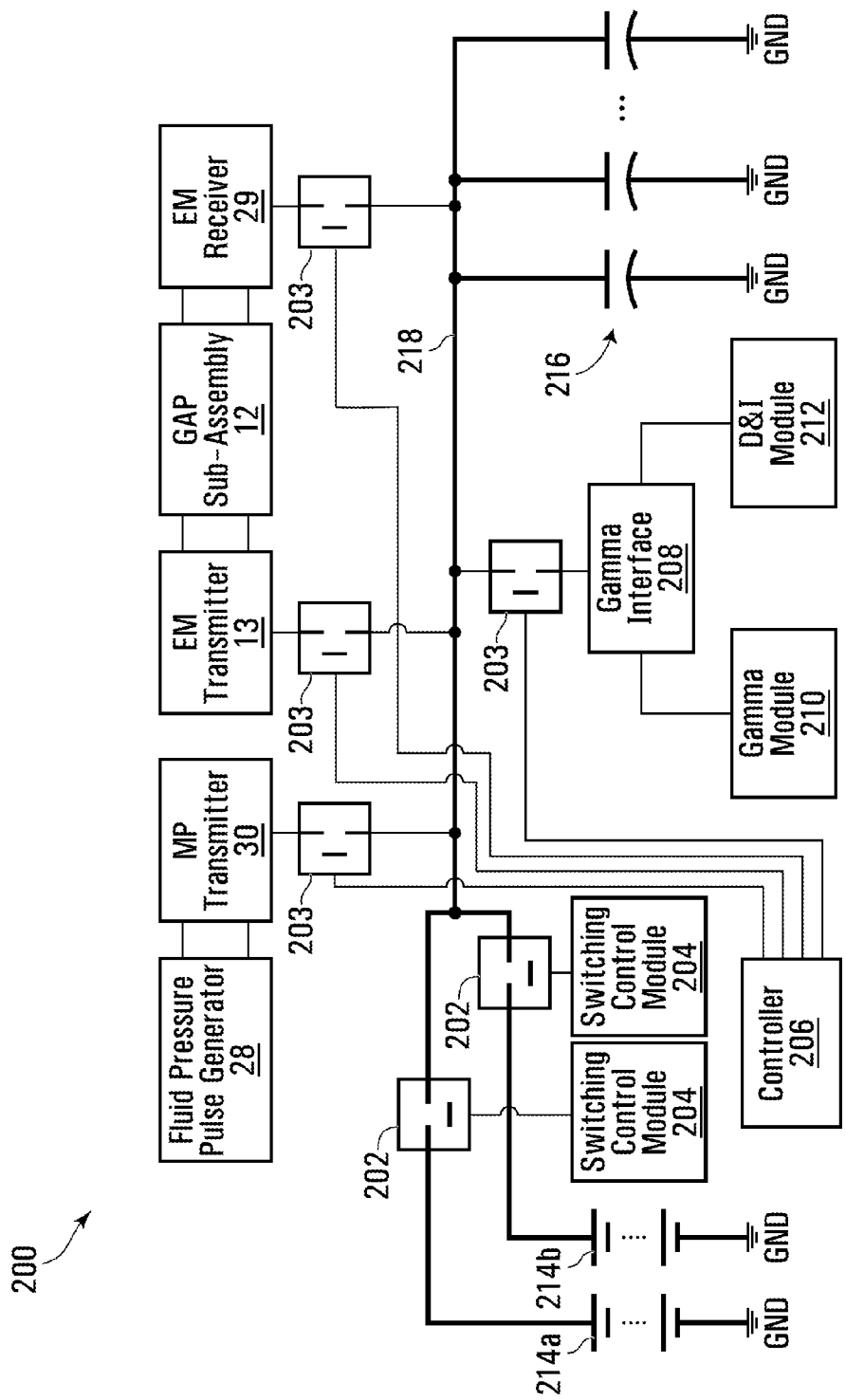
FIG. 2 is a block diagram of an electronics subassembly that forms part of the system of FIG. 1 and that can be used to charge a capacitor used to power MWD equipment, according to another embodiment.

Referring now to FIG. 2, there is shown an electronics subassembly 200 that includes sensors for taking various downhole measurements, and encoding and processing equipment for encoding the measurements and other information (collectively, "telemetry data") into a telemetry signal for transmission by the EM transmitter 13. The electronics subassembly 200 is housed within a tubular housing (not shown). The sensors shown in FIG. 2 are a direction and inclination ("D&I") module 212 and a gamma module 210. The D&I module 212 includes three axis accelerometers, three axis magnetometers and associated data acquisition and processing circuitry. The gamma module 210 includes a gamma ray detector. Other types of sensors, not shown in FIG. 2, may also be included in the electronics subassembly 200 in alternative embodiments; for example, one or more additional sensors may be included that measure borehole parameters and conditions including temperature, pressure, shock, vibration, and RPM. The gamma and D&I modules 210,212 are communicatively coupled to and controlled by a D&I and gamma interface 208. An exemplary D&I and gamma interface 208 is a dsPIC™ digital signal controller from Microchip Technology Inc.

The encoding and processing equipment includes an MP transmitter 30 communicatively coupled to the fluid pressure pulse generator 28, and the EM transmitter 13 and EM receiver 29, each of which is electrically connected to and isolated from the other by the gap sub assembly 12.

The D&I and gamma interface 208, MP transmitter 30, EM transmitter 13, and EM receiver 29 are each electrically connected to a power bus 218 via switches 203 that are controlled by a power management controller 206, which may be, for example, a PIC18 8-bit PIC™ microcontroller from Microchip Technology Inc. In the depicted embodiment these switches 203 are voltage regulators having an enable pin with which the power management controller 206 is communicative. Although not indicated in FIG. 2, the controller 206 also is communicatively coupled to each of the D&I and gamma interface 208, the MP transmitter 30, the EM transmitter 13, and the MP receiver 29 in order to receive sensor measurements, to transmit these sensor measurement to the surface, and to receive downlink signals sent downhole from the surface.

First and second batteries 214a,b (collectively, the "batteries 214") are connected to first and second pairs of battery terminals (not shown), which are electrically connected in parallel. The first and second pairs of battery terminals are respectively electrically connected in series to a pair of switches 202 that are each electrically connected in series to the power bus 218. The switch 202 that connects the first pair of battery terminals to the power bus 218 is hereinafter the "first switch 202", while the switch 202 that connects the second pair of battery terminals to the power bus 218 is hereinafter the "second switch 202". The controller 206 is independently communicative with the first and second switches 202 via a pair of switching control modules 204, each of which is connected to one of the first and second switches 202 and to the controller 206. The first and second switches 202 are MOSFET switches, and the control modules 204 are MOSFET controllers. In the depicted embodiment the batteries 214 are each J size batteries having ten cells, with each cell rated at 3.6 V and 40 A·h. Each of the batteries 214 is consequently rated at 36 V and 40 A·h.

Electrically connected in parallel to the power bus 218 is a capacitor bank 216, comprising multiple capacitors. The capacitor bank 216, when charged, stores charge that can be used to temporarily supplement current output by the batteries 214, thereby helping to reduce current draw on the batteries 214 during times of relatively high electrical load. The capacitor bank 216 accordingly helps to provide stable power to electrical loads that draw power from the power bus 218. As discussed in further detail below, the capacitor bank 216 can be charged by closing one or both of the first and second switches 202, which electrically connects the batteries 214 to the capacitor bank 216. An exemplary capacitor bank 216 includes anywhere from one to ten capacitors connected in parallel; for example, five capacitors connected in parallel with the capacitor bank 216 rated at 13.5 mF.

Figure 3:
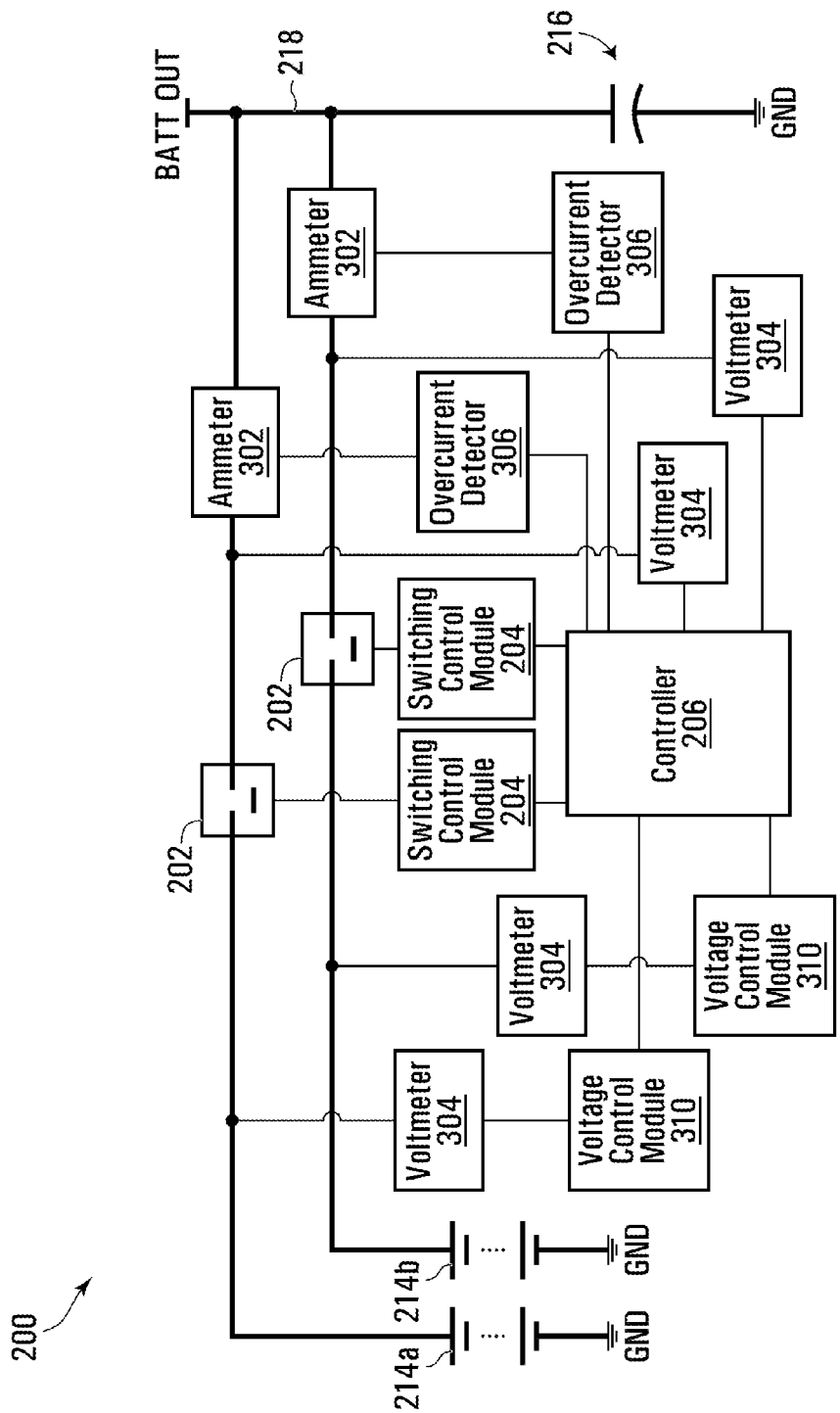
FIG. 3 is a block diagram of a portion of another embodiment of the electronics assembly that can be used to charge a capacitor used to power MWD equipment, according to another embodiment.

Referring now to FIG. 3, there is shown a portion of another embodiment of the electronics subassembly 200. Like the embodiment of the electronics subassembly 200 of FIG. 2, the electronics subassembly 200 of FIG. 3 incorporates the batteries 214, controller 206, switching control modules 204, first and second switches 202, the power bus 218, and the capacitor bank 216 in a structurally identical manner as shown in FIG. 2. However, the electronics subassembly of FIG. 3 also includes data collection circuitry. The data collection circuitry includes first and second voltmeters 304 electrically connected in parallel to the first and second pairs of battery terminals between the battery terminals and the first and second switches 202, respectively, and first and second ammeters 302 electrically connected in series to the first and second pairs of battery terminals, respectively. The data collection circuitry also includes third and fourth voltmeters 304 electrically coupled in parallel between the first switch 202 and the power bus 218 and the second switch 202 and the power bus 218, respectively. The first and second voltmeters 304 communicate with the controller 206 via voltage control modules 310 that digitize the voltage reading from the voltmeters 304 for processing by the controller 206, whereas the third and fourth voltmeters 304 are directly communicative with and sampled by the controller 206. The first ammeter 302 communicates with the controller 206 via a first overcurrent detector 306, while the second ammeter 302 communicates with the controller 206 via a second overcurrent detector 306. As with the voltage control modules 310, each of the overcurrent detectors 306 digitizes the ammeter readings for subsequent processing by the controller 206. Each of the overcurrent detectors 306 is also able to compare the current discharged by one of the batteries 214 to a shutdown current, and to output a signal that shuts down the electronics subassembly 200 if the current from either of the batteries 214 exceeds the shutdown current. Although not shown in FIG. 3, each of the overcurrent detectors 306 may have a shutdown output connected to one or more reset inputs elsewhere in the electronics subassembly 200 to reset the electronics subassembly 200 in the event battery current becomes excessive. In contrast to the embodiment of the electronics subassembly 200 shown in FIG. 2, then, the embodiment of FIG. 3 provides the controller 206 with feedback information in the form of the voltages of the batteries 214 and the current being discharged by the batteries 302, which the controller 206 can use to determine how to charge the capacitor bank 216, as discussed in further detail below.

As shown in FIGS. 2 and 3, the capacitor bank 216 may comprise multiple capacitors as it does in FIG. 2, or alternatively may include only a single capacitor, as shown in FIG. 3.

Figure 8:
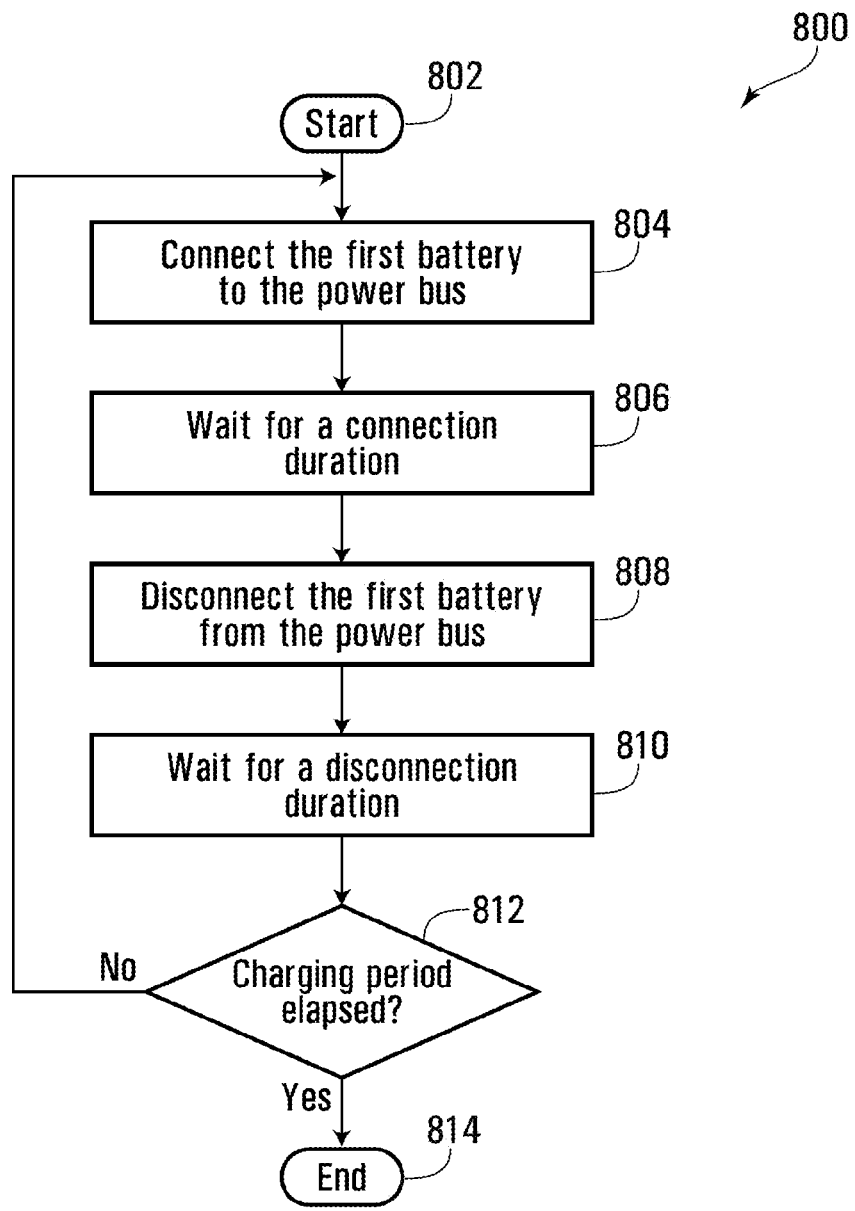
FIGS. 8 and 9 are methods for charging a capacitor used to power MWD equipment, according to additional embodiments.

Referring now to FIG. 8, there is shown a method 800 for charging a capacitor used to power MWD equipment; when used in conjunction with the electronics subassembly 200 of FIG. 3, the method 800 is used to charge the capacitor bank 216. The method 800 is encoded on to a computer readable medium (not shown) within the controller 206 as statements and instructions that cause the controller to perform the method 800. The method 800 does not require the use of voltage or current feedback, and consequently can be performed by the electronics subassembly shown in FIGS. 2 and 3.

In one application of the method 800, both the first and second switches 202 are open immediately prior to the method 800 commencing, and the second switch 202 remains open for the duration of the method 800, which means that neither of the batteries 214 are electrically connected to the capacitor bank 216. The method 800 begins at step 802, following which the controller 206 proceeds to step 804 and connects the first battery 214a to the power bus 218 by closing the first switch 202. The controller 206 then proceeds to step 806 where it allows the first battery 214a to remain connected to the capacitor bank 216 for a connection duration. When the capacitance of the capacitor bank 216 is 13.5 mF and each of the batteries 214 is rated at 36 V and 40 A·h, an exemplary connection duration is approximately 1.5 ms.

The controller 206 then proceeds to step 808 and disconnects the first battery 214a from the power bus 218 by opening the first switch 202. The controller 206 then proceeds to step 810 where it keeps the first battery 214a disconnected from the capacitor bank 216 for a disconnection duration. When the capacitance of the capacitor bank 216 is 13.5 mF and each of the batteries 214 is rated at 36 V and 40 A·h, an exemplary disconnection duration is approximately 2 ms. After waiting for the disconnection duration, the controller 206 proceeds to step 812 and checks to see whether the capacitor bank 216 has been charged for a charging period, which is a period of time empirically determined to result in the capacitor bank 216 being sufficiently charged by performing the actions described in steps 804 to 810. In the depicted embodiment, the charging period is 3 seconds. If the charging period has elapsed, the controller 206 proceeds to step 814 and the method 800 ends. If the charging period has not yet elapsed, the controller 206 proceeds back to step 804 and again connects the capacitor bank 216 to the first battery 214a.

After the charging period elapses, the controller 206 keeps one or both of the batteries 214 electrically coupled for an indefinite period of time to the power bus 218 and, consequently, the capacitor bank 216. As the capacitor bank 216 will have been charged, current draw from the batteries 214 electrically connected to the power bus 218 by the capacitor bank 216 is low and keeping at least one of the batteries 214 electrically coupled to the power bus 218 allows the other electronic components in the electronics subassembly to be powered.

After the charging period elapses, the controller 206 keeps the first battery 214a electrically coupled to the power bus 218 and, consequently, the capacitor bank 216. As the capacitor bank 216 will have been charged, current draw from the first battery 214a by the capacitor bank 216 is low and keeping the first battery 214a electrically coupled to the power bus 218 allows the other electronic components in the electronics subassembly to be powered.

In the foregoing embodiment, the connection and disconnection durations are determined empirically prior to deploying the MWD tool. These durations are selected so that battery voltage remains above a voltage floor ($V_{floor}$) and battery current remains below a current ceiling while the capacitor is being charged. The voltage floor represents the minimum voltage to which the voltages of the batteries 214 are allowed to decrease, as a result of the batteries' 214 internal resistances, while charging the capacitor bank 216. In the depicted embodiments in which each of the batteries 214 has a voltage of 36 V when no current is being drawn from them, the voltage floor is set to be approximately 50% of this value, or approximately 18 V. Similarly, the electronics subassembly 200 includes a fuse (not shown) that blows at the current ceiling, which in the depicted embodiments is approximately 7 A. This helps to prevent damage to the electronics subassembly 200 in the event that voltage monitoring alone proves insufficient.

Referring now to FIGS. 4 through 7, there are shown examples of waveforms 402 of battery voltage measured during charging of the capacitor bank 216, according to various embodiments.

Example: Pulse Width Modulation

Figure 4:
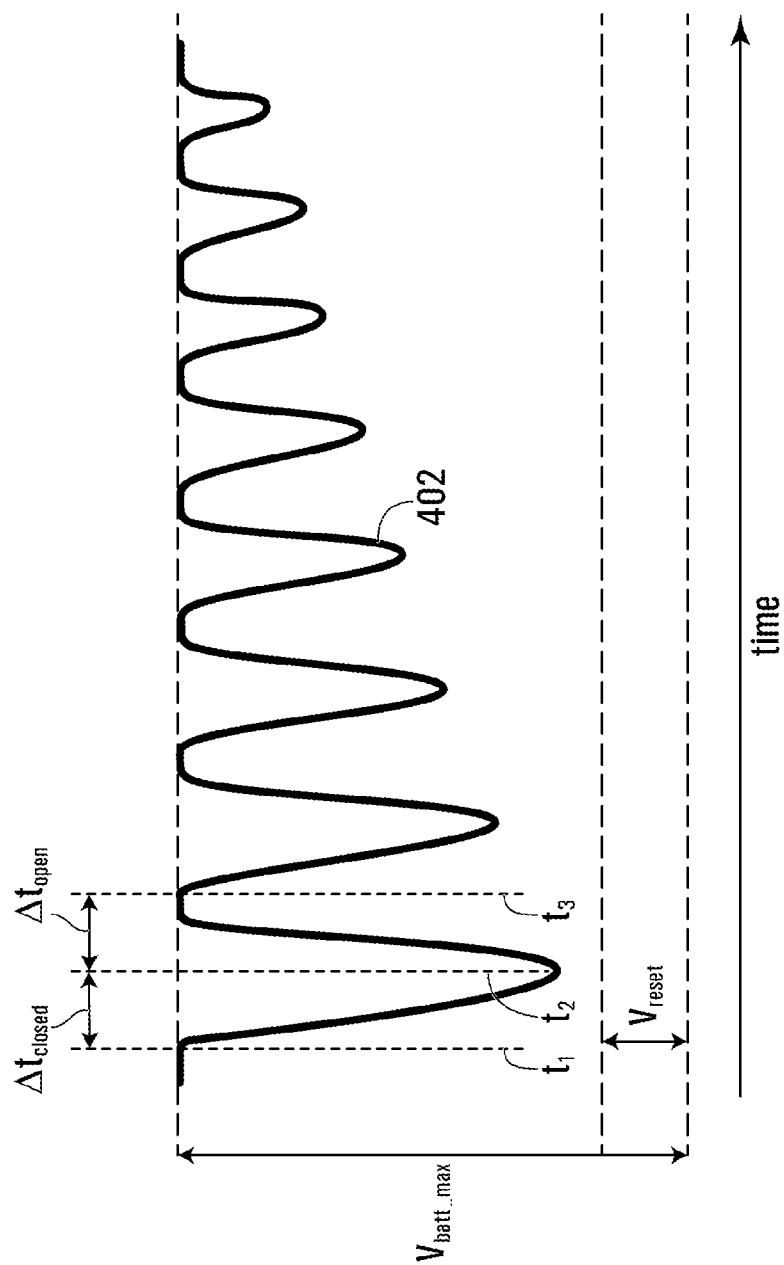
FIGS. 4 to 7 are waveforms of battery voltage measured during charging of a capacitor, according to additional embodiments.

FIG. 4 displays a waveform 402 of the voltage measured at the first pair of battery terminals when the capacitor bank 216 is being charged with the first battery 214a, as described above in respect of FIG. 8. The maximum voltage of the first battery 214a when it is discharging no current is shown as $V_{batt\_max}$. The reset voltage of the entire electronics subassembly 200, which is the voltage at which the electronics subassembly 200 will restart, is depicted as $V_{reset}$. The controller 206 monitors the voltage of the first battery 214a and resets the electronics assembly if it falls below the reset voltage.

At time $t_1$, the controller 206 closes the first switch 202 and electrically connects the first battery 214a to the capacitor bank 216; this corresponds to step 804 of the method 800 of FIG. 8. The voltage of the first battery 214a is significantly drawn down due to the high current used to initially charge the capacitor bank 216, but remains about the reset voltage. The controller 206 then allows the capacitor bank 216 to charge for the connection duration, labeled $\Delta t_{closed}$ in FIG. 4, which corresponds to step 806 of the method 800 of FIG. 8. After the connection duration, the controller 206 opens the first switch 202 at time $t_2$, which disconnects the first battery 214a from the capacitor bank 216 and which corresponds to step 808 of the method 800 of FIG. 8. The controller 206 keeps the capacitor bank 216 and the first battery 214a disconnected for the disconnection duration, labeled $\Delta t_{open}$ in FIG. 4, which corresponds to step 810 of the method 800 of FIG. 8. At time $t_3$, the controller 206 determines whether the capacitor bank 216 is fully charged; it can do this by measuring the voltage of the capacitor bank 216 when both the first and second switches 202 are open. Because at time $t_3$ in FIG. 4 the capacitor bank 216 is not fully charged, the controller 206 returns to step 804 of the method 800 of FIG. 8, and the charging cycle repeats, as shown in FIG. 4. A "charging cycle" in respect of FIG. 4 refers to the time between sequential instances in which the first switch 202 is closed; e.g., one charging cycle is between $t_1$ and $t_3$.

Example: Pulse Width Modulation with Voltage Floor

Figure 6:
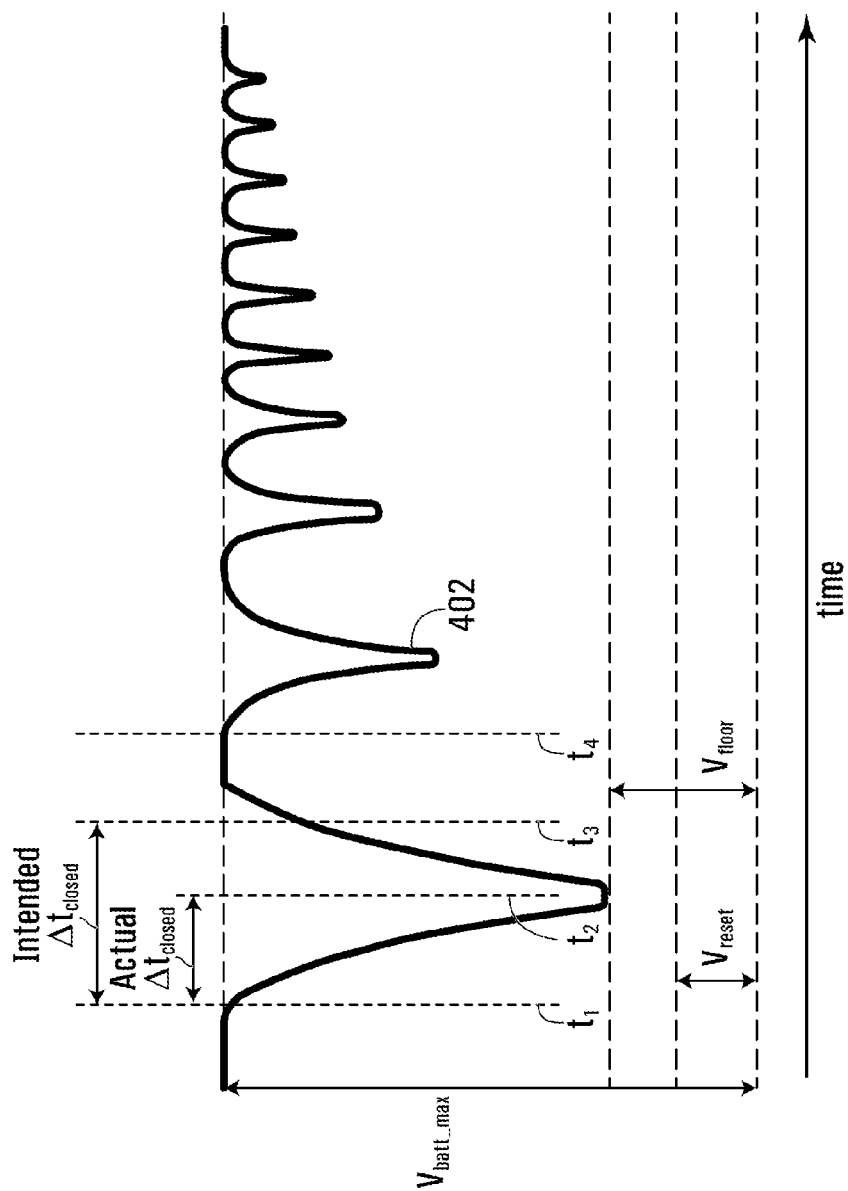
Figure 7:
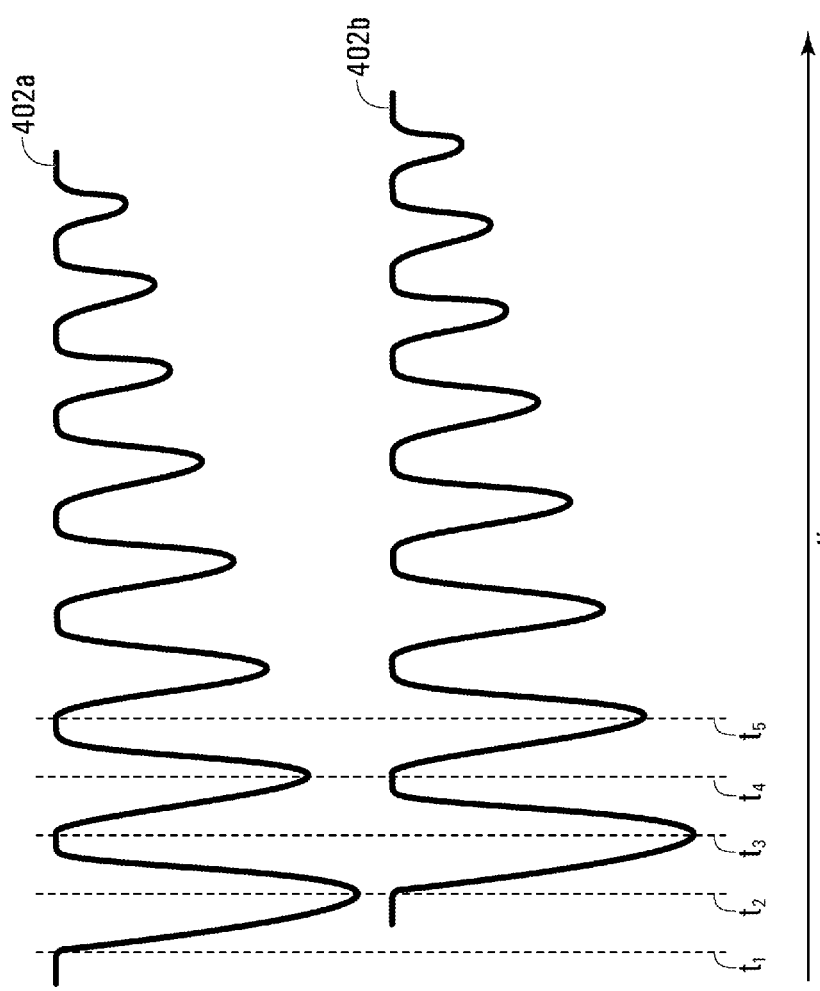

Referring now to FIGS. 6 and 7, there are shown waveforms 402 of the voltage measured at the first pair of battery terminals when the capacitor bank 216 is being charged with the first battery 214a in embodiments in which the controller 206 monitors battery voltage and responds if the battery voltage drops below the voltage floor.

Figure 5:
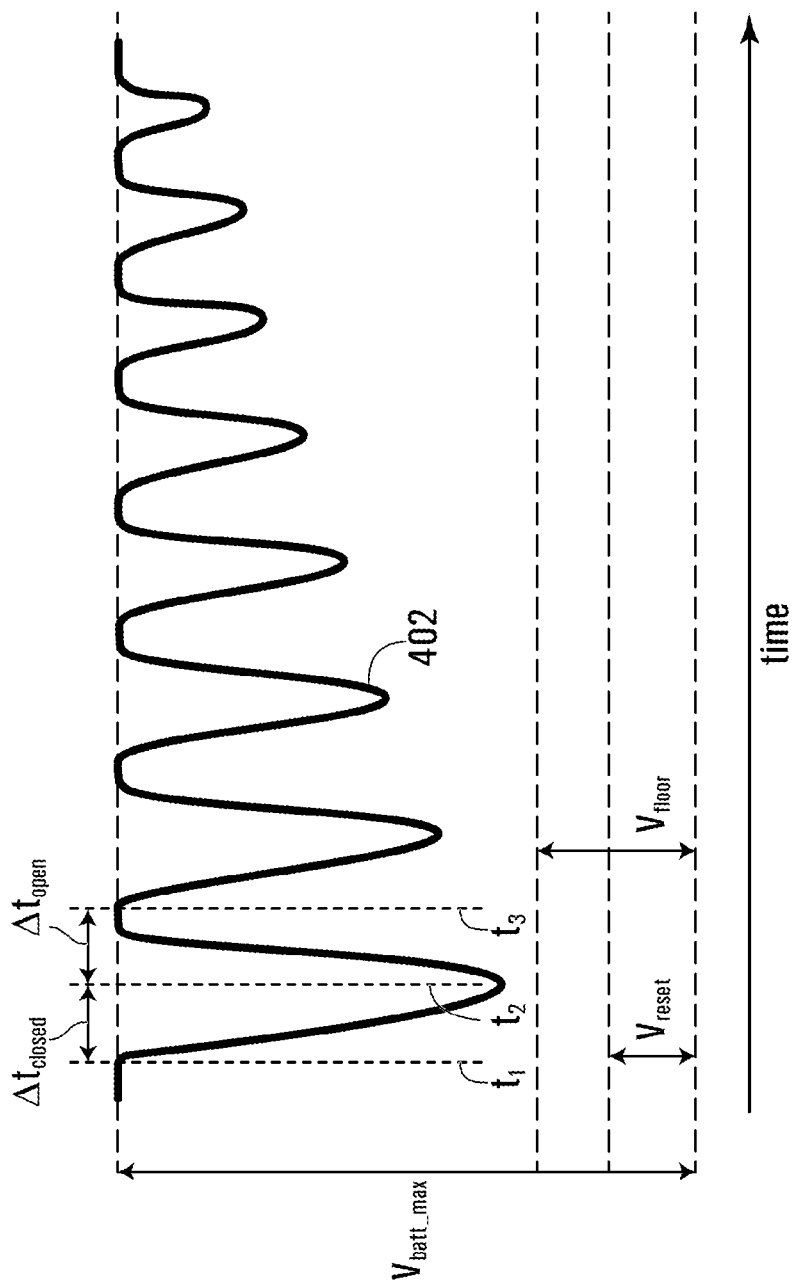

Because battery voltage does not fall below the voltage floor in FIG. 5, the waveform 402 shown in FIG. 5 is identical to that of FIG. 4 notwithstanding that the controller 206 is monitoring battery voltage to ensure that it remains above the voltage floor. However, in FIG. 6, the waveform 402 does fall below the voltage floor. To prevent the voltage from continuing to fall and dropping below the reset, when the battery voltage drops below the voltage floor the controller 206 opens the first switch 202 and disconnects the first battery 206 from the capacitor bank 216. As shown in FIG. 6, the actual closed duration for the first charging cycle of the capacitor bank 216 is $t_2-t_1$, and is shorter than the intended closed duration for the charging cycle, which is $t_3-t_1$. Subsequent charging cycles in which the battery voltage does not drop below the voltage floor occur as described in respect of FIG. 4. The actual charging cycle in FIG. 5 is $t_4$ (the next time at which the switch 202 closes after time $t_1$)–$t_1$.

Example: Dual Battery Charging

Referring now to FIG. 7, there are shown first and second waveforms 402a,b that result from charging the capacitor bank 216 using both the first and second batteries 214a,b. The first waveform 402a is the voltage measured across the first pair of battery terminals and consequently is the voltage of the first battery 214a, while the second waveform 402b is the voltage measured across the second pair of battery terminals and consequently is the voltage of the second battery 214b.

To generate the waveforms 402 of FIG. 7, the controller 206 is configured to alternate between only charging the capacitor bank 216 using the first battery 214a by electrically connecting the first pair of battery terminals to the power bus 218 and electrically disconnecting the second pair of battery terminals from the power bus 218, and only charging the capacitor bank 216 using the second battery 214b by electrically connecting the second pair of battery terminals to the power bus 218 and electrically disconnecting the first pair of battery terminals from the power bus 218. This is now described with reference to FIG. 7 and to FIG. 9, which shows an embodiment of a method 900 for charging the capacitor bank 216 using the first and second batteries 214. In FIG. 7, exemplary charging cycles for the first battery 214a are between 1) $t_1$ and $t_3$ and 2) $t_3$ and $t_5$, whereas an exemplary charging cycle for the second battery 214b is between $t_2$ and $t_4$.

The controller 206 begins performing the method 900 at step 902 and proceeds to step 904. At step 904 the controller 206 disconnects the second battery 214b from the capacitor bank 216 by opening the second switch 202 (or, if the second battery 214b is already disconnected, ensures that the second switch 202 remains open) and closes the first switch 202 to connect the first battery 214a to the capacitor bank 216. This occurs at time $t_1$ of FIG. 7. The controller 206 then proceeds to step 906 where it waits for a first battery connection duration, following which it proceeds to step 908. The first battery connection duration refers to the length of time the first battery 214a is electrically connected to the capacitor bank 216 and that the second battery 214b is consequently disconnected from the capacitor bank 216. At step 908, which occurs at time $t_2$ of FIG. 7, the controller 206 disconnects the first battery 214a from the capacitor bank 216 by opening the first switch 202 and closes the second switch 202 to connect the second battery 214b to the capacitor bank 216. The controller 206 then proceeds to step 910 where it waits for a second battery connection duration, which refers to the length of time the second battery 214b is electrically connected to the capacitor bank 216 and the first battery 214a is consequently disconnected from the capacitor bank 216. The controller 206 then proceeds to step 912 and checks to see whether the capacitor bank 216 has been charged for a charging period, which is a period of time empirically determined to result in the capacitor bank 216 being sufficiently charged by performing the actions described in steps 904 to 910. In the depicted embodiment, the charging period is 3 seconds. If the charging period has elapsed, the controller 206 proceeds to step 914 and the method 900 ends. If the charging period has not yet elapsed, the controller 206 proceeds back to step 904 and again connects the capacitor bank 216 to the first battery 214a.

In an alternative embodiment (not depicted), the controller 206 checks the voltage of the capacitor bank 216 using the third and fourth voltmeters 304 to determine whether it is charged. If the capacitor bank 216 has been charged, the controller 206 proceeds to step 914 and the method 900 ends. However, if the capacitor bank 216 has not yet been charged, the controller 206 returns to step 904 and again connects the capacitor bank 216 to the first battery 214a.

After the charging period elapses, the controller 206 keeps one or both of the batteries 214 electrically coupled for an indefinite period of time to the power bus 218 and, consequently, the capacitor bank 216. As the capacitor bank 216 will have been charged, current draw from the any batteries 214a electrically connected to the power bus 218 by the capacitor bank 216 is low and keeping at least one of the batteries 214 electrically coupled to the power bus 218 allows the other electronic components in the electronics subassembly to be powered.

The controller 206 then proceeds to step 912 where it checks the voltage of the capacitor bank 216 to determine whether it is sufficiently charged; if yes, the method 900 ends at step 914. If no, which is the case at time $t_3$ after the controller 206 has waited for the second battery connection duration the first time, the controller 206 proceeds back to step 904 and continues to charge the capacitor bank 216 by alternating between the first and second batteries 214a,b. In FIG. 7 for example, from times $t_3$ to $t_4$ the capacitor bank 216 is charged only by the first battery 214a, and from times $t_4$ to $t_5$ the capacitor bank 216 is charged only by the second battery 214b.

Figure 9:
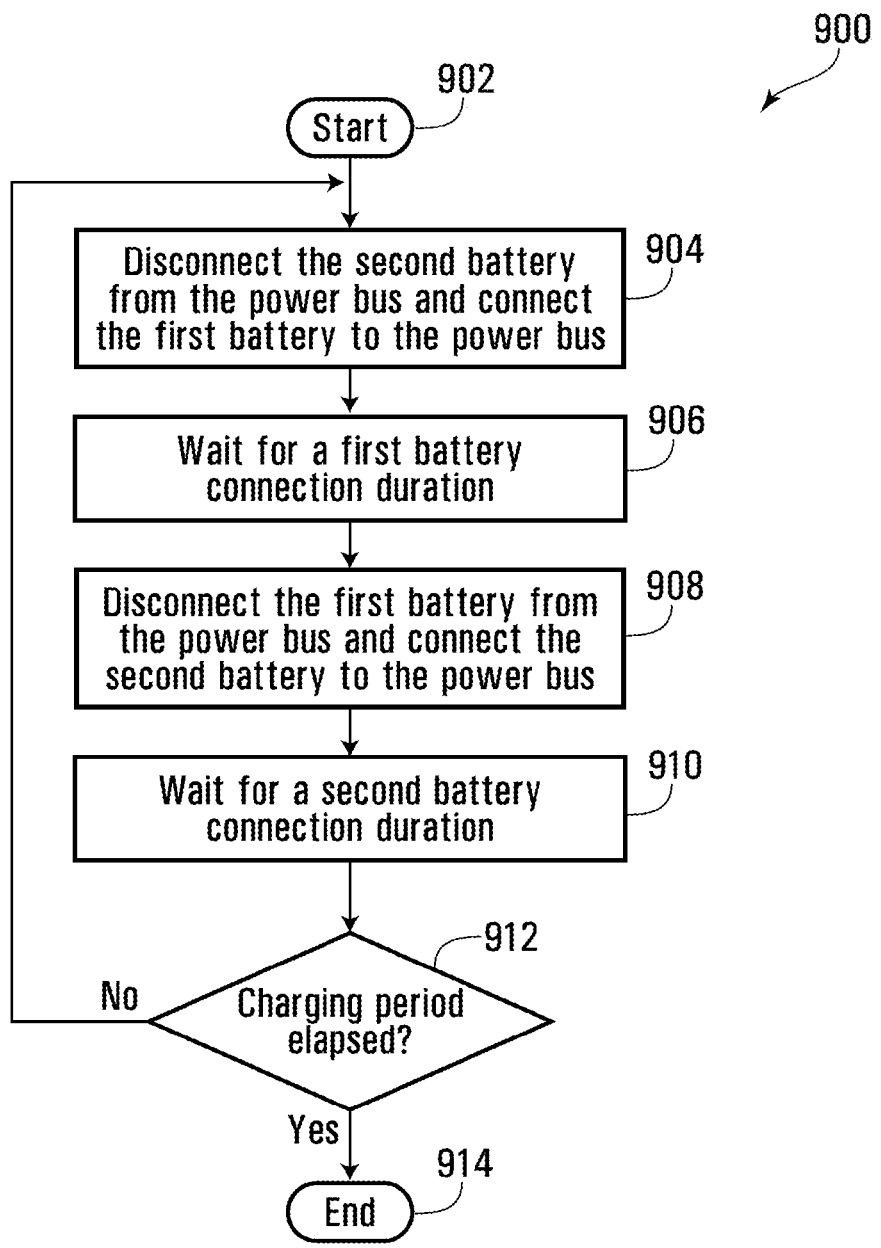

In the embodiment of FIG. 9, the controller 206 keeps one of the batteries 214 electrically connected to the capacitor bank 216 constantly throughout charging assuming that the battery voltages do not drop below the voltage floor. However, in alternative embodiments (not shown), even when charging using multiple batteries the controller 206 may select during the charging period to disconnect all of the batteries from the capacitor 216 to pause charging regardless of whether the battery voltage is above the voltage floor.

In FIGS. 8 and 9, the controller 206 electrically opens and closes the first and second switches 202 by applying first and second pulse width modulated control signals to the first and second switching control modules 204, respectively. In the depicted embodiment, when one of the pulse width modulated control signals are high, the switch 202 controlled by that control signal is closed. Similarly, when one of the pulse width modulated control signals is low, the switch 202 controlled by that control signal is open. While in the depicted embodiment the controller 206 directly generates the first and second pulse width modulated control signals by outputting the signals through different output pins, in an alternative embodiment (not depicted) the controller 206 may indirectly generate both signals by outputting only a single control signal and using logic, external to the controller 206, to generate the other control signal. For example, in an embodiment in which the first and second control signals are inverted, an inverter outside of the controller 206 may be used to invert the first control signal, which the controller 206 outputs, to generate the second control signal. The duty cycles of the pulse width modulated control signals are selected so that the voltages of the batteries 214 remain above a minimum operating voltage. In the depicted embodiment this minimum operating voltage is the reset voltage, although in alternative embodiments (not shown) dropping below this minimum operating voltage may result in an action other than a reset being performed. For example, in an embodiment in which the minimum operating voltage corresponds to a shutoff voltage, dropping below the threshold may result in the system shutting down.

In the depicted embodiments the batteries 214 are identical to each other, and consequently the same reset voltages and voltage floors are used for both batteries 214. In alternative embodiments (not depicted), regardless of whether the batteries 214 are identical different reset voltages and voltage floors may be used for the batteries. For example, the first battery 214a may have a first reset voltage and a first voltage floor, while the second battery 214b may have a second reset voltage and a second voltage floor. Similarly, in embodiments (not shown) that have three or more batteries, any two or more of the batteries may share reset voltages or voltage floors.

Charging the capacitor bank 216 using both of the batteries 214 helps to preserve the batteries' 214 lives, since each is used only half as much as opposed to embodiments in which only one of the batteries 214 is used to charge the capacitor bank 216. Using both of the batteries 214 also charges the capacitor bank 216 more quickly, since instead of the capacitor bank 216 not being charged during the disconnection durations of FIG. 8, in certain embodiments one of the batteries 214 is always connected to and charging the capacitor bank 216.

Figure 10:
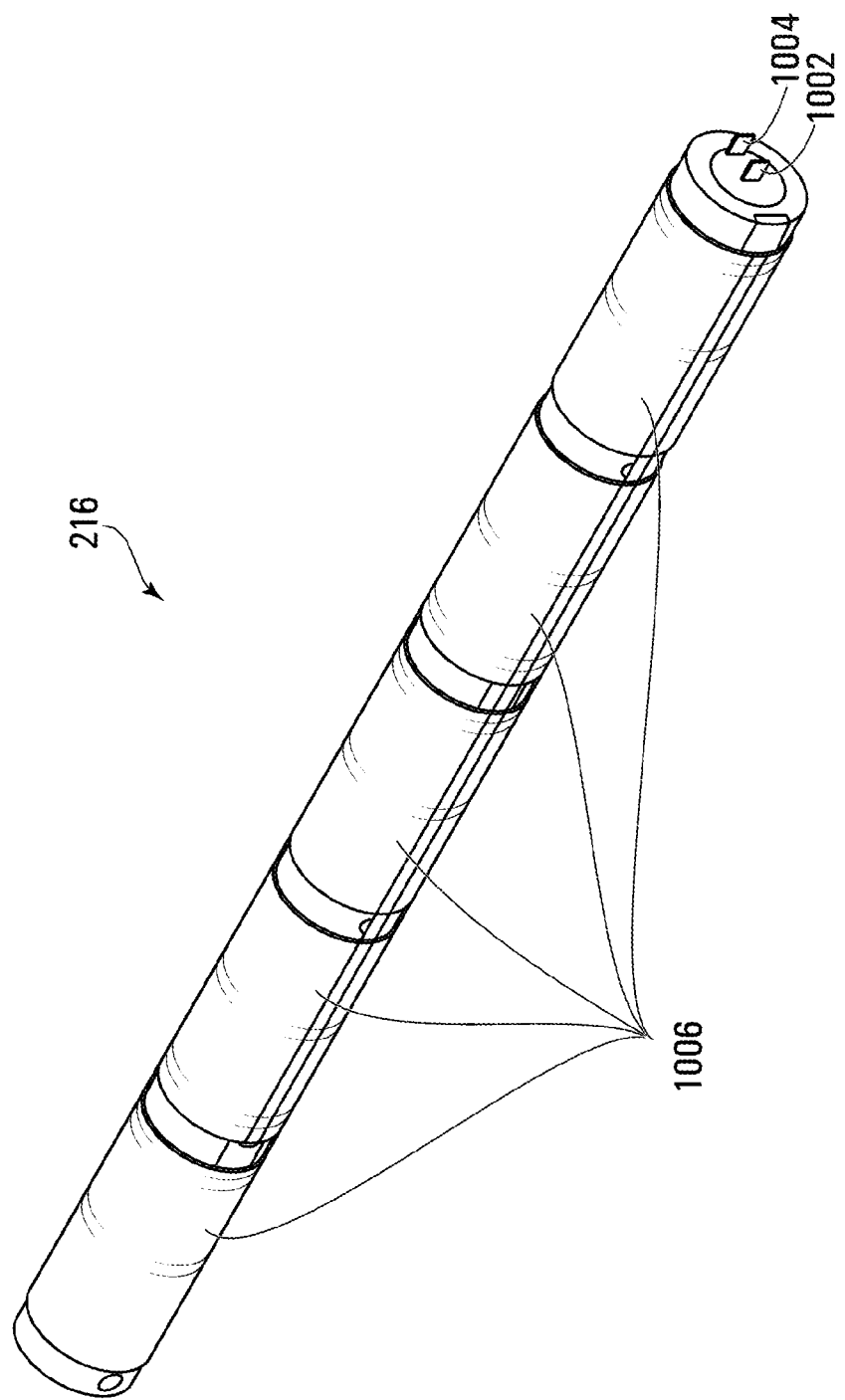
FIG. 10 is a perspective view of a capacitor bank, according to another embodiment.

The capacitor bank 216 may be contained within a modular housing to permit relatively easy electrical connection to and disconnection from the remainder of the electronics subassembly 200, as is shown in FIG. 10. In FIG. 10, five capacitors 1006 are electrically connected in parallel to form the modular housing, which is cylindrical in shape. At one of the flat ends of the capacitor bank 216 are a positive terminal 1002 for electrically connecting to the power bus 218 and a negative terminal 1004 for electrically connecting to ground. The tubular housing in which the electronics subassembly 200 is housed has an opening into which the capacitor bank 216 as shown in FIG. 10 may be inserted. Any suitable type of detachable coupling may be used to physically couple the capacitor bank 216 to the remainder of the electronics subassembly 200. In FIG. 10, the positive and negative terminals 1002,1004 comprise a plug that may be inserted into a socket (not shown) on the electronics subassembly 200. In alternative embodiments (not depicted), however, other types of couplings may be used, such as latches. An exemplary capacitance of the capacitors 1006 used in the capacitor bank 216 is 2,700 µF. Furthermore, while five capacitors 1006 are shown in FIG. 10, in alternative embodiments (not depicted) a different number of capacitors 1006 may be used, such as between one and ten capacitors 1006.

The embodiments described herein can help facilitate the use of relatively high capacitance capacitor banks 216. For example, by preventing the battery voltage from dropping below the voltage floor, large capacitor banks 216 can be charged that otherwise would draw such a high current during charging that they would force the electronics subassembly 200 to reset. In conventional systems this can be a problem particularly during system start-up or initialization when the capacitor bank 216 is being charged for the first time, and consequently draws relatively high current.

Although not shown in FIG. 7, the controller 206 may also be configured to monitor battery voltages and react to the battery voltages dropping below one or both of the voltage floor or the reset voltage, as described above in respect of FIGS. 5 and 6.

In the foregoing embodiments, one exemplary type of capacitor that may be used in the capacitor bank 216 is a high temperature electrolytic capacitor. This type of capacitor has relatively good reliability and, if it does fail, tends to fail as an open circuit instead of a short circuit.

The controller used in the foregoing embodiments may be, for example, a microprocessor, microcontroller, digital signal processor, programmable logic controller, field programmable gate array, or an application-specific integrated circuit. Examples of the computer readable medium are non-transitory and include disc-based media such as CD-ROMs and DVDs, magnetic media such as hard drives and other forms of magnetic disk storage, semiconductor based media such as flash media, random access memory, and read only memory.

It is contemplated that any part of any aspect or embodiment discussed in this specification can be implemented or combined with any part of any other aspect or embodiment discussed in this specification.

For the sake of convenience, the exemplary embodiments above are described as various interconnected functional blocks. This is not necessary, however, and there may be cases where these functional blocks are equivalently aggregated into a single logic device, program or operation with unclear boundaries. In any event, the functional blocks can be implemented by themselves, or in combination with other pieces of hardware or software.

While particular embodiments have been described in the foregoing, it is to be understood that other embodiments are possible and are intended to be included herein. It will be clear to any person skilled in the art that modifications of and adjustments to the foregoing embodiments, not shown, are possible.

What is claimed is:

1. A system for charging a capacitor used to power measurement-while-drilling equipment, the system comprising:
   (a) a power bus and the capacitor, wherein the capacitor is electrically connected to the power bus and wherein the measurement-while-drilling equipment is electrically connected to the power bus when powered by the capacitor;
   (b) a first pair of battery terminals for connecting to a first battery;
   (c) a second pair of battery terminals for connecting to a second battery and electrically connected in parallel to the first pair of battery terminals;
   (d) first switching circuitry operable in a closed state to electrically connect the power bus to the first pair of battery terminals and in an open state to disconnect the power bus from the first pair of battery terminals, and second switching circuitry operable in a closed state to electrically connect the power bus to the second pair of battery terminals and in an open state to disconnect the power bus from the second pair of battery terminals independently from the first pair of battery terminals; and
   (e) a controller configured to alternate between:
      (i) only charging the capacitor using the first battery by electrically connecting the first pair of battery terminals to the power bus by operating the first switching circuitry in the closed state and electrically disconnecting the second pair of battery terminals from the power bus by operating the second switching circuitry in the open state, wherein durations for which the power bus is connected to the first pair of battery terminals are selected such that the voltage of the first battery remains above a first minimum operating voltage while the capacitor is being charged by the first battery; and
      (ii) only charging the capacitor using the second battery by electrically connecting the second pair of battery terminals to the power bus by operating the second switching circuitry in the closed state and electrically disconnecting the first pair of battery terminals from the power bus by operating the first switching circuitry in the open state, wherein durations for which the power bus is connected to the second pair of battery terminals are selected such that the voltage of the second battery remains above a second minimum operating voltage while the capacitor is being charged by the second battery.

2. The system of claim 1 wherein the controller is configured to charge the capacitor using the first battery by applying a first pulse width modulated control signal to control the first switching circuitry, wherein the first pulse width modulated control signal has a duty cycle selected such that the voltage of the first battery remains above the first minimum operating voltage while the capacitor is being charged by the first battery.

3. The system of claim 2 wherein the first minimum operating voltage is a reset voltage, and wherein the controller is further configured to reset the system if the voltage of the first battery drops below the reset voltage.

4. The system of claim 3, wherein the controller is further configured to disconnect the first pair of battery terminals from the power bus when the voltage of the first battery drops below a voltage floor, wherein the voltage floor is above the reset voltage.

5. The system of claim 4 wherein the voltage floor is 50% of the maximum voltage of the first battery.

6. The system of claim 2 wherein the first pulse width modulated control signal is configured to cause the first battery to be connected to the power bus for 1.5 ms and disconnected from the power bus for 2 ms for each charging cycle.

7. The system of claim 2 wherein the controller is configured to charge the capacitor using the first battery for a charging period.

8. The system of claim 7 wherein the controller is further configured to electrically connect the first pair of battery terminals to the capacitor following the charging period and to subsequently keep the first pair of battery terminals and the capacitor electrically connected.

9. The system of claim 2 further comprising a first voltmeter, communicative with the controller, and electrically connected in parallel to the first pair of battery terminals such that the voltage of the first battery can be determined.

10. The system of claim 2 further comprising a first ammeter electrically connected in series to the first pair of battery terminals such that current flowing out of the first battery can be determined.

11. The system of claim 2 wherein the controller is further configured to apply a second pulse width modulated control signal to the second switching circuitry to charge the capacitor using the second battery,
   wherein the second pulse width modulated control signal has a duty cycle selected such that the voltage of the second battery remains above the second minimum operating voltage while the capacitor is being charged.

12. The system of claim 11 wherein the first and second minimum operating voltages are identical.

13. The system of claim 12 wherein the minimum operating voltages are a reset voltage, and wherein the controller is further configured to reset the system if the voltage of the first or second batteries drops below the reset voltage.

14. The system of claim 13, wherein the controller is further configured to disconnect the first pair of battery terminals from the power bus when the voltage of the first battery drops below a first voltage floor and to disconnect the second pair of battery terminals from the power bus when the voltage of the second battery drops below a second voltage floor, wherein the voltage floors are above the reset voltage.

15. The system of claim 14 wherein the first and second voltage floors are identical.

16. The system of claim 15 wherein the voltage floors are 50% of the maximum voltage of the first battery.

17. The system of claim 11 wherein the pulse width modulated control signals are configured to cause the capacitor to always be charged by at least one of the batteries if the voltage of the capacitor is lower than the voltage of at least one of the batteries.

18. The system of claim 11 wherein the pulse width modulated control signals are configured to cause each of the batteries to be connected to the power bus for 1.5 ms for each charging cycle and disconnected from the power bus for 2.0 ms for each charging cycle.

19. The system of claim 11 wherein the controller is configured to charge the capacitor for a charging period.

20. The system of claim 19 wherein the controller is further configured to electrically connect at least one of the pairs of battery terminals to the capacitor following the charging period and to subsequently keep the at least one of the pairs of battery terminals and the capacitor electrically connected.

21. The system of claim 11 further comprising first and second voltmeters, communicative with the controller, and electrically connected in parallel to the first and second pairs of battery terminals, respectively, such that the voltages of the first and second batteries can be determined.

22. The system of claim 11 further comprising first and second ammeters electrically connected in series to the first and second pairs of battery terminals, respectively, such that current flowing out of the first and second batteries can be determined.

23. A method for charging a capacitor used to power measurement-while-drilling equipment, the method comprising alternating between:
  (a) only charging the capacitor using a first battery by electrically connecting the first battery to a power bus by closing first switching circuitry and electrically disconnecting a second battery from the power bus by opening second switching circuitry, wherein durations for which the capacitor and the first battery are electrically connected are selected such that first battery voltage remains above a first minimum operating voltage while the capacitor is being charged by the first battery, and wherein the measurement-while-drilling equipment and the capacitor are electrically connected when the measurement-while-drilling equipment is powered by the capacitor; and
  (b) only charging the capacitor using the second battery by electrically connecting the second battery to the power bus by closing the second switching circuitry and electrically disconnecting the first battery from the power bus by opening the first switching circuitry, wherein durations for which the capacitor and the second battery are electrically connected are selected such that the voltage of the second battery remains above a second minimum operating voltage while the capacitor is being charged by the second battery.

24. The method of claim 23 wherein a first pulse width modulated control signal is used to intermittently electrically connect the capacitor to and disconnect the capacitor from the first battery, wherein the first pulse width modulated control signal has a duty cycle selected such that the voltage of the first battery remains above the first minimum operating voltage while the capacitor is being charged by the first battery.

25. The method of claim 24 wherein the minimum operating voltage is a reset voltage, and further comprising:
  (a) monitoring the voltage of the first battery; and
  (b) resetting circuitry used to charge the capacitor if the voltage of the first battery drops below the reset voltage.

26. The method of claim 25 further comprising disconnecting the first battery from the capacitor when the voltage of the first battery drops below a voltage floor, wherein the voltage floor is above the reset voltage.

27. The method of claim 26 wherein the voltage floor is 50% of the maximum voltage of the first battery.

28. The method of claim 23 wherein the first pulse width modulated control signal is configured to cause the first battery to be connected to the power bus for 1.5 ms and to be disconnected from the power bus for 2 ms for each charging cycle.

29. The method of claim 23 wherein the first battery charges the capacitor for a charging period.

30. The method of claim 29 further comprising, following the charging period, electrically connecting the first battery to the capacitor and subsequently keeping the first battery and the capacitor electrically connected.

31. The method of claim 24 wherein a second pulse width modulated control signal is used to intermittently electrically connect the capacitor to and disconnect the capacitor from the second battery,
  wherein the second pulse width modulated control signal has a duty cycle selected such that the voltage of the second battery remains above the second minimum operating voltage while the capacitor is being charged.

32. The method of claim 31 wherein the first and second minimum operating voltages are identical.

33. The method of claim 32 wherein the minimum operating voltages are a reset voltage and further comprising:
  (a) monitoring the voltages of the first and second batteries; and
  (b) resetting circuitry used to charge the capacitor if the voltage of the first or second batteries drops below the reset voltage.

34. The method of claim 33 further comprising disconnecting the first battery from the power bus when the voltage of the first battery drops below a first voltage floor and disconnecting the second battery from the power bus when the voltage of the second battery drops below a second voltage floor, wherein the voltage floors are above the reset voltage.

35. The method of claim 34 wherein the first and second voltage floors are identical.

36. The method of claim 35 wherein the voltages of the first and second batteries are identical and the voltage floors are 50% of the maximum voltage of the first battery.

37. The method of claim 31 wherein the pulse width modulated control signals are configured to cause the capacitor to always be charged by at least one of the batteries if the voltage of the capacitor is lower than the voltage of at least one of the batteries.

38. The method of claim 31 wherein the pulse width modulated control signals are configured to cause each of the batteries to alternately be connected to the power bus for 1.5 ms for each charging cycle.

39. The method of claim 31 wherein the capacitor is charged for a charging period.

40. The method of claim 39 further comprising electrically connecting at least one of the batteries to the capacitor following the charging period and subsequently keeping the at least one of the batteries and the capacitor electrically connected.

41. A non-transitory computer readable medium having encoded thereon statements and instructions configured to cause a controller to perform a method for charging a capacitor used to power measurement-while-drilling equipment and that is located within a measurement-while-drilling tool, the method comprising alternating between:
  (a) only charging the capacitor using a first battery by electrically connecting the first battery to a power bus by closing first switching circuitry and electrically disconnecting a second battery from the power bus by opening second switching circuitry, wherein durations for which the capacitor and the first battery are electrically connected are selected such that first battery voltage remains above a first minimum operating voltage while the capacitor is being charged by the first battery, and wherein the measurement-while-drilling equipment and the capacitor are electrically connected when the measurement-while-drilling equipment is powered by the capacitor; and (b) only charging the capacitor using the second battery by electrically connecting the second battery to the power bus by closing the second switching circuitry and electrically disconnecting the first battery from the power bus by opening the first switching circuitry, wherein durations for which the capacitor and the second battery are electrically connected are selected such that the voltage of the second battery remains above a second minimum operating voltage while the capacitor is being charged by the second battery.

\* \* \* \* \*